US008545591B2

(12) United States Patent
Fairweather et al.

(10) Patent No.: US 8,545,591 B2
(45) Date of Patent: Oct. 1, 2013

(54) POTASSIUM SULFITE/POTASSIUM BISULFITE (KS/KBS) LIQUID AS STARTER, SIDE-DRESS, BROADCAST, FOLIAR AND FERTIGATION FERTILIZERS

(75) Inventors: Thomas D. Fairweather, Dundee, OR (US); Michael Massoud Hojjatie, Tucson, AZ (US)

(73) Assignee: Tessenderlo Kerley, Inc., Phoenix, AZ (US)

( * ) Notice: Subject to any disclaimer, the term of this patent is extended or adjusted under 35 U.S.C. 154(b) by 0 days.

(21) Appl. No.: 13/440,939

(22) Filed: May 10, 2012

(65) Prior Publication Data

US 2012/0255335 A1 Oct. 11, 2012

Related U.S. Application Data

(60) Provisional application No. 61/471,694, filed on Apr. 5, 2011.

(51) Int. Cl.
*C05D 1/00* (2006.01)
(52) U.S. Cl.
USPC .............. 71/61; 71/64.1; 423/519; 423/519.2
(58) Field of Classification Search
USPC ........................ 71/61, 64.1; 423/519, 519.2
See application file for complete search history.

(56) References Cited

U.S. PATENT DOCUMENTS

| | | | |
|---|---|---|---|
| 2,555,634 A | 6/1951 | De Bruijn et al. | |
| 3,615,199 A * | 10/1971 | Terrana et al. | 423/519 |
| 3,899,293 A * | 8/1975 | Bush | 422/15 |
| 4,370,239 A * | 1/1983 | Jensen | 210/668 |
| 6,241,795 B1 | 6/2001 | Svec et al. | |
| 6,426,182 B1 | 7/2002 | Carrico | |
| 7,585,652 B2 | 9/2009 | Foody et al. | |
| 2003/0108472 A1 | 6/2003 | Duncan et al. | |
| 2005/0119124 A1 | 6/2005 | Alyeshmerni | |
| 2006/0236735 A1 | 10/2006 | Johnson et al. | |
| 2010/0003733 A1 | 1/2010 | Foody et al. | |

OTHER PUBLICATIONS

Tessenderlo Kerley. "Ammonium Polysulfide Solution APS-600 Application Guide" (Jan. 2010) <<http://www.tkinet.com/Documents/ApplicationGuide/APS%20600%20Ap%20Guide.pdf>>downloaded from internet Aug. 17, 2012; p. 1-4.
A & L Great Lakes Laboratories. "Fertilizer Salt Index—Fact Sheet No. 15" (May 2002) <<http://www.algreatlakes.com/PDF/factsheets/ALGLFS15_Fertilizer_Salt_Index.PDF>>downloaded from internet Aug. 17, 2012; p. 1-2.
International Search Report and Written Opinion from the International Searching Authority dated Sep. 21, 2012, for PCT Application No. PCT/US2012/032433 filed Apr. 5, 2012.
Invitation to Pay Additional Fees dated Jun. 29, 2012 from PCT/US2012/032433 filed on Apr. 5, 2012.

* cited by examiner

*Primary Examiner* — Wayne Langel
(74) *Attorney, Agent, or Firm* — Fennemore Craig, P.C.

(57) ABSTRACT

The present invention provides a new liquid fertilizer comprised of potassium sulfite and potassium bisulfite, with neutral to slightly alkaline pH, relatively lower salt index and potentially lower phytotoxicity damage compared to other sources of potassium and sulfur products applied in equal amounts as a starter fertilizer. More specifically, the present invention further relates to methods for fertilizing using a composition of potassium sulfite and potassium bisulfite, particularly as a starter fertilizer, in-furrow fertilizer, side dress fertilizer, and for foliar, broadcast, soil injection and fertigation applications. The fertilizer composition is comprised primarily of potassium sulfite and potassium bisulfite (with the fertilizer grade of 0-0-23-8S).

57 Claims, 1 Drawing Sheet

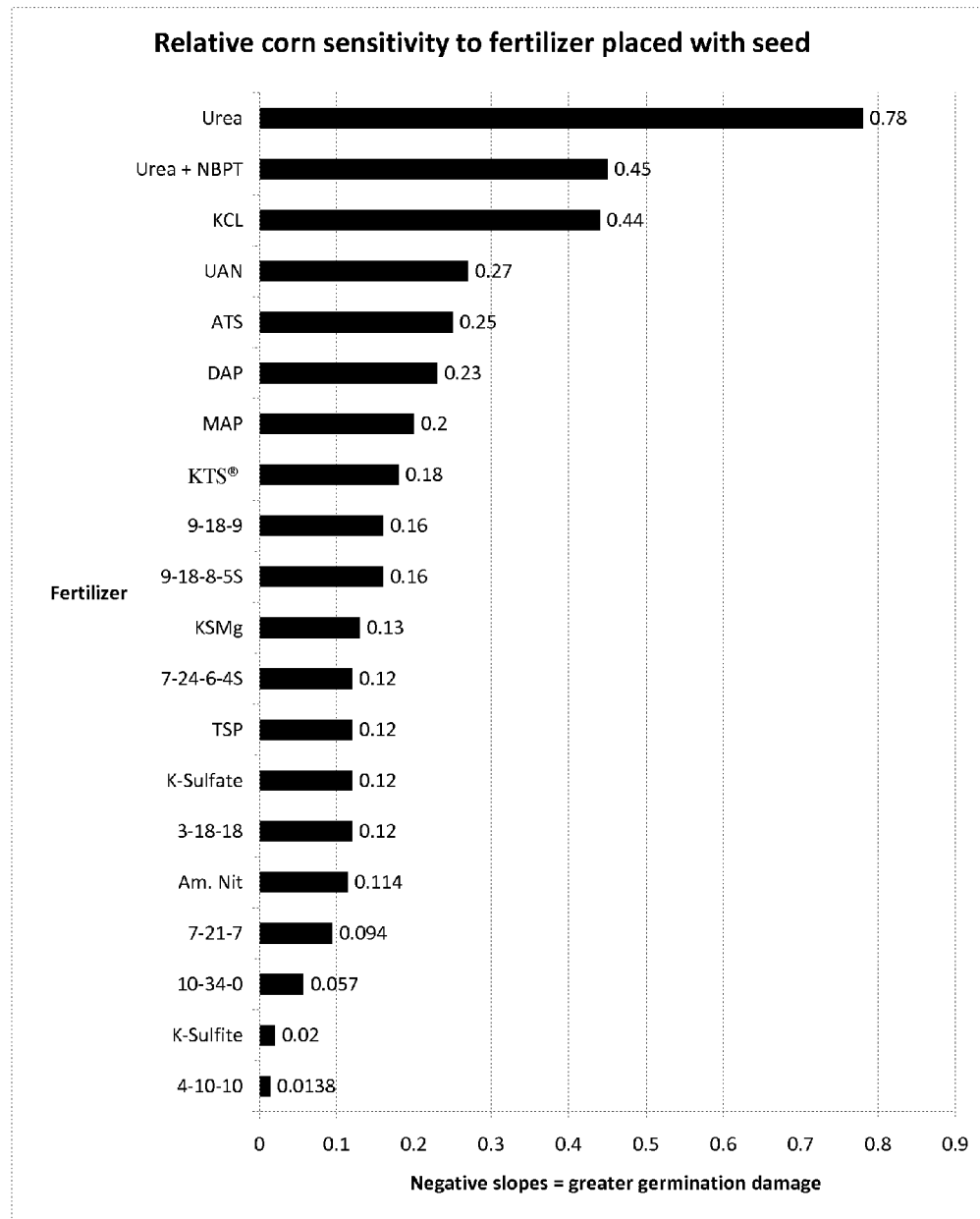

POTASSIUM SULFITE/POTASSIUM BISULFITE (KS/KBS) LIQUID AS STARTER, SIDE-DRESS, BROADCAST, FOLIAR AND FERTIGATION FERTILIZERS

RELATED APPLICATION DATA

This application claims priority to U.S. Provisional Patent Application No. 61/471,694 filed Apr. 5, 2011, the entirety of which is incorporated herein.

FIELD OF THE INVENTION

This invention relates to plant fertilizers that are useful in agriculture. Due to the increase in demand for agricultural productivity worldwide, the demand for fertilizers containing the primary plant nutrients nitrogen, phosphorous and potassium has increased.

BACKGROUND OF THE INVENTION

Mineral fertilizers are a cornerstone of modern day agriculture. Without them, worldwide production of all crops would be greatly reduced, placing a greater stress on our food supply system.

Fertilizers come in two basic forms, liquid and dry. In the U.S., over the last 50 years, liquid fertilizers have been gaining in popularity mainly due to the ease of handling and application.

For a liquid fertilizer to become a commercially viable product, it must have a fairly high nutrient analysis and must be able to blend with other liquid fertilizers to supply the required nutrients for a growing crop.

Urea ammonium nitrate (UAN) is a popular liquid fertilizer containing about 28-32% nitrogen. Ammonium polyphosphate (APP), another commonly used liquid fertilizer, contains from about 34-47% phosphate.

Sulfur (S) has emerged as a major nutrient for plants. It is considered the fourth major plant nutrient, after nitrogen, phosphorous and potassium, due to the amount required by plants. Sulfur is essential as a structural component of some amino acids found in both plants and animals, and is a part of the makeup of every living organism. Chlorophyll formation is also dependent on proper sulfur uptake.

About 10 million metric tons of sulfur-containing fertilizers are applied annually worldwide and have the potential to increase another 8 million tons. Applications of sulfur-containing fertilizers will increase even more due to the reduction in industrial sulfur dioxide emissions and the subsequent depletion of sulfur in the soil. In recent history, industrial sulfur dioxide emissions captured and transported by rainfall have been a significant source of sulfur for crop production, but environmental restrictions have reduced airborne $SO_2$ levels since the 1980's. Soil sulfur levels have become depleted with prolonged crop removal, sulfate leaching, low precipitation deposition, and declining soil organic matter.

Although sulfur exists in many different chemical forms, plants can only absorb sulfur through their root systems in the form of sulfate anion ($SO_4^{-2}$). Small amounts of sulfur dioxide gas can be absorbed through the plant's leaves, but the amount is too small to satisfy the plant's need.

There are two types of available sulfur-containing fertilizers for the crop application. The first type includes those fertilizers that are in the form of sulfate, which are ready for the plant's uptake. Examples of sulfate fertilizers are ammonium sulfate, sulfate of potash, and single superphosphate (SSP). These fertilizers may contain nitrogen (N), phosphorous (P), or potassium (K) as well, but they also are important due to sulfur (S) content. Sulfate fertilizers represent about 75% of the sulfur fertilizers applied annually.

The second type of sulfur-containing fertilizers are those materials containing sulfur in oxidation states of the sulfur other than sulfate, which need to go through chemical oxidation reaction to form the sulfate form which can be taken up by plants. Thiosulfate and elemental sulfur are examples of the second type. These forms of sulfur undergo chemical oxidation in the environment to convert to sulfate anion.

Another form of sulfur can exist as sulfite anion ($SO_3^{-2}$) or as bisulfite anion ($HSO_3^{-1}$). Potassium sulfite and potassium bisulfite are examples of sulfur in the sulfite or bisulfite forms. Potassium sulfite has been used as an anti-browning agent, an antioxidant and as a preservative. It is used as wine, beer, and fruit juice preservation. It is also used in fresh fruit and meat preservation. The preservative potassium sulfite is used as an E225 preservative. Both potassium bisulfite and potassium sulfite are used as photographic chemicals in film development.

In addition to being characterized according to their content and form, fertilizers are also characterized by how they are utilized in horticulture. For example, "starter fertilizer" is used to promote the growth of newly planted crops, particularly newly germinated seeds. Starter fertilizers are applied in low doses close to the plant seed to meet the demands of the seedling for nutrients until the plant's root system develops. They also enhance the development of the emerging seedling. Starter fertilizers are most beneficial when the crops are planted in cold and wet soil in the early spring or late fall. They are also used when the soil nutrients levels are low. In addition to N, P, and K, sulfur is a key component of the starter fertilizer.

To improve early season plant growth in cool soils, many crop producers band small amounts of starter fertilizers at planting. Applying fertilizer 2 inches to the side of the seed row and 2 inches below the seed row (2×2) or 2 inches to the side and on the surface (2×0) places the nutrients in a good position for root absorption. This has proven to be very effective for many crops, especially in minimum and no-tillage conditions where soils remain cooler for a longer period of time in the early spring.

To accomplish this, separate fertilizer openers are required to place the material in a 2×2 placement. This has a number of disadvantages such as cost, weight of the openers, residue clearance, planter space and soil disturbance which can adversely affect seed placement[1].

To avoid these problems, growers are placing fertilizers directly with the seed. This type of application is called a pop-up or in-furrow treatment. In-furrow treatments have proven to be agronomically as effective as 2×2 and 2×0 placements[2]. However, there are several factors to consider that can have a negative effect on germination and/or seedling injury.

Crop sensitivity to fertilizer salts, cation exchange capacity (CEC) of the soil, soil type and moisture, organic matter, row spacing, and fertilizer band width are a few factors that must be considered in choosing the fertilizer and method for starter fertilization, along with the amount of risk a grower is willing to accept, including possible crop maturity delays[3].

Germination damage caused by fertilizers is primarily due to salt or osmotic effect, where fertilizer salts draw critical moisture from the seeds and soil surrounding the seeds. In some cases there is a toxic ion effect where certain ions can be toxic to germinating seeds, such as ammonia generated from urea hydrolysis. It is for this reason that university agricultural extension personnel do not recommend banding urea with the seed.

Many crops require side dressing to flourish properly. The term "top-dress" usually refers to broadcast applications on crops like small grains. The term "side dress" refers to fertilizer placed at relatively high amounts anywhere from three to four inches from the row to half way between the crop rows.

Plants absorb nutrients as well as other chemicals through their foliage to varying degrees. Growers in most all types of agriculture apply foliar nutritional sprays from time to time for various reasons. A basic philosophy many growers utilize is to apply what is believed to be required to the soil in the fertilization program, and use nutritional foliar supplements as a tool to give crops any nutrients they may still be lacking. Even though growers and researchers use this technique as a nutritional supplement, the mechanism of foliar absorption of nutrients is not well understood.

SUMMARY OF THE INVENTION

The present invention provides a new liquid fertilizer comprised of potassium sulfite and potassium bisulfite, with neutral to slightly alkaline pH, relatively lower salt index and potentially lower phytotoxicity damage compared to other sources of potassium and sulfur products applied in equal amounts as a starter fertilizer. More specifically, the present invention further relates to methods for fertilizing using a composition of potassium sulfite and potassium bisulfite, particularly as a starter fertilizer, in-furrow fertilizer, side dress fertilizer, and for foliar, broadcast, soil injection and fertigation applications. The fertilizer composition is comprised primarily of potassium sulfite (with the fertilizer grade of 0-0-23-8S).

Potassium sulfite and potassium bisulfite (KS/KBS) solution is proposed as a starter product for in-furrow fertilizers. It was tested both in greenhouse experiments and field studies. KS/KBS was found to be about 6 to 9 times (v/v) less likely to burn the germinating seed than potassium thiosulfate, about 4 to 6 times safer than potassium sulfate, and about 10 to 22 times safer than potassium chloride. KS/KBS showed little to no phytotoxicity when applied at reasonable rates as foliar fertilizer. KS/KBS is a solution containing fairly high levels of potassium (P) and sulfur (S) with a low salt index and neutral/moderate pH range of 7.5-8.5.

BRIEF DESCRIPTION OF THE DRAWING

The FIGURE is a graph of the results of a study illustrating the relative sensitivity of germinating corn seed to various fertilizers placed with the corn seed.

DETAILED DESCRIPTION OF THE INVENTION

Tessenderlo Kerley Inc., Phoenix, Ariz. produces a solution, referred to herein as "KS/KBS", of potassium sulfite ($K_2SO_3$) and potassium bisulfite ($KHSO_3$) at the highest pH allowable from sulfur dioxide and potassium hydroxide without co-absorption of $CO_2$ and at the highest concentration. Potassium sulfite is referred to as "KS", and potassium bisulfite is referred to as "KBS". The KS/KBS mixture is produced according to the following reaction pathways:

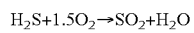

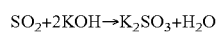

The sulfur source for producing the composition of the invention is typically sulfur dioxide ($SO_2$) obtained from refinery off-gas, but may also be $SO_2$ obtained from other sources.

Alternatively, pure elemental sulfur may be used as the sulfur source, but usually will be more expensive than $SO_2$ obtained from refinery off-gas and does not provide the advantageous environmental benefit of recycling of waste gases. However, use of pure sulfur has the advantage that it will not give off carbonates when oxidized to form $SO_2$.

The KS/KBS is comprised mostly of potassium sulfite (KS) at pH about 8.3-8.5. The ratio of KS/KBS may be changed by changing the pH of the composition, as reflected in Table 1. Analysis of KS/KBS mixture ratios (parts KS to parts KBS) versus pH was performed in the lab which is pH dependent. The numbers in Table 1 shown in italics are the data points. The rest of the numbers are interpolated between data points.

TABLE 1

Analysis of KS/KBS Ratios vs. pH.

| KS/KBS Ratio | pH | S/C Ratio ($SO_2$/K) | Bisulfite ($KHSO_3$) | Sulfite ($K_2SO_3$) |
|---|---|---|---|---|
| 0.00 | 4.00 | 1.0000 | 10.00 | 0.00 |
| 0.05 | 4.91 | 0.9524 | 9.50 | 0.50 |
| 0.11 | 5.82 | 0.9091 | 9.00 | 1.00 |
| 0.18 | 6.04 | 0.8696 | 8.50 | 1.50 |
| 0.25 | 6.26 | 0.8333 | 8.00 | 2.00 |
| 0.33 | 6.42 | 0.8000 | 7.50 | 2.50 |
| 0.43 | 6.57 | 0.7692 | 7.00 | 3.00 |
| 0.54 | 6.70 | 0.7407 | 6.50 | 3.50 |
| 0.67 | 6.82 | 0.7143 | 6.00 | 4.00 |
| 0.72 | 6.86 | 0.7042 | 5.80 | 4.20 |
| 0.79 | 6.90 | 0.6944 | 5.60 | 4.40 |
| 0.85 | 6.93 | 0.6849 | 5.40 | 4.60 |
| 0.92 | 6.97 | 0.6757 | 5.20 | 4.80 |
| 1.00 | 7.01 | 0.6667 | 5.00 | 5.00 |
| 1.04 | 7.03 | 0.6623 | 4.90 | 5.10 |
| 1.08 | 7.04 | 0.6579 | 4.80 | 5.20 |
| 1.13 | 7.06 | 0.6536 | 4.70 | 5.30 |
| 1.17 | 7.07 | 0.6494 | 4.60 | 5.40 |
| 1.22 | 7.09 | 0.6452 | 4.50 | 5.50 |
| 1.27 | 7.11 | 0.6410 | 4.40 | 5.60 |
| 1.33 | 7.12 | 0.6369 | 4.30 | 5.70 |
| 1.38 | 7.14 | 0.6329 | 4.20 | 5.80 |
| 1.44 | 7.15 | 0.6289 | 4.10 | 5.90 |
| 1.50 | 7.17 | 0.6250 | 4.00 | 6.00 |
| 1.56 | 7.20 | 0.6211 | 3.90 | 6.10 |
| 1.63 | 7.23 | 0.6173 | 3.80 | 6.20 |
| 1.70 | 7.25 | 0.6135 | 3.70 | 6.30 |
| 1.78 | 7.28 | 0.6098 | 3.60 | 6.40 |
| 1.86 | 7.31 | 0.6061 | 3.50 | 6.50 |
| 1.94 | 7.34 | 0.6024 | 3.40 | 6.60 |
| 2.03 | 7.37 | 0.5988 | 3.30 | 6.70 |
| 2.13 | 7.39 | 0.5952 | 3.20 | 6.80 |
| 2.23 | 7.42 | 0.5917 | 3.10 | 6.90 |
| 2.33 | 7.45 | 0.5882 | 3.00 | 7.00 |
| 2.45 | 7.47 | 0.5848 | 2.90 | 7.10 |
| 2.57 | 7.49 | 0.5814 | 2.80 | 7.20 |
| 2.70 | 7.51 | 0.5780 | 2.70 | 7.30 |
| 2.85 | 7.53 | 0.5747 | 2.60 | 7.40 |
| 3.00 | 7.56 | 0.5714 | 2.50 | 7.50 |
| 3.17 | 7.58 | 0.5682 | 2.40 | 7.60 |
| 3.35 | 7.60 | 0.5650 | 2.30 | 7.70 |
| 3.55 | 7.62 | 0.5618 | 2.20 | 7.80 |
| 3.76 | 7.64 | 0.5587 | 2.10 | 7.90 |
| 4.00 | 7.66 | 0.5556 | 2.00 | 8.00 |
| 4.13 | 7.69 | 0.5540 | 1.95 | 8.05 |
| 4.26 | 7.71 | 0.5525 | 1.90 | 8.10 |
| 4.41 | 7.74 | 0.5510 | 1.85 | 8.15 |
| 4.56 | 7.77 | 0.5495 | 1.80 | 8.20 |
| 4.71 | 7.80 | 0.5479 | 1.75 | 8.25 |
| 4.88 | 7.82 | 0.5464 | 1.70 | 8.30 |
| 5.06 | 7.85 | 0.5450 | 1.65 | 8.35 |

TABLE 1-continued

Analysis of KS/KBS Ratios vs. pH.

| KS/KBS Ratio | pH | S/C Ratio (SO$_2$/K) | Bisulfite (KHSO$_3$) | Sulfite (K$_2$SO$_3$) |
|---|---|---|---|---|
| 5.25 | 7.88 | 0.5435 | 1.60 | 8.40 |
| 5.45 | 7.90 | 0.5420 | 1.55 | 8.45 |
| 5.67 | 7.93 | 0.5405 | 1.50 | 8.50 |
| 5.90 | 7.96 | 0.5391 | 1.45 | 8.55 |
| 6.14 | 7.98 | 0.5376 | 1.40 | 8.60 |
| 6.41 | 8.01 | 0.5362 | 1.35 | 8.65 |
| 6.69 | 8.04 | 0.5348 | 1.30 | 8.70 |
| 7.00 | 8.07 | 0.5333 | 1.25 | 8.75 |
| 7.33 | 8.09 | 0.5319 | 1.20 | 8.80 |
| 7.70 | 8.12 | 0.5305 | 1.15 | 8.85 |
| 8.09 | 8.15 | 0.5291 | 1.10 | 8.90 |
| 8.52 | 8.17 | 0.5277 | 1.05 | 8.95 |
| 9.00 | 8.20 | 0.5263 | 1.00 | 9.00 |
| 9.53 | 8.29 | 0.5249 | 0.95 | 9.05 |
| 10.11 | 8.38 | 0.5236 | 0.90 | 9.10 |
| 10.76 | 8.47 | 0.5222 | 0.85 | 9.15 |
| 11.50 | 8.56 | 0.5208 | 0.80 | 9.20 |
| 12.33 | 8.65 | 0.5195 | 0.75 | 9.25 |
| 13.29 | 8.74 | 0.5181 | 0.70 | 9.30 |
| 14.38 | 8.83 | 0.5168 | 0.65 | 9.35 |
| 15.67 | 8.92 | 0.5155 | 0.60 | 9.40 |
| 17.18 | 9.01 | 0.5141 | 0.55 | 9.45 |
| 19.00 | 9.10 | 0.5128 | 0.50 | 9.50 |
| 21.22 | 9.19 | 0.5115 | 0.45 | 9.55 |
| 24.00 | 9.28 | 0.5102 | 0.40 | 9.60 |
| 27.57 | 9.37 | 0.5089 | 0.35 | 9.65 |
| 32.33 | 9.46 | 0.5076 | 0.30 | 9.70 |
| 39.00 | 9.55 | 0.5063 | 0.25 | 9.75 |
| 49.00 | 9.64 | 0.5051 | 0.20 | 9.80 |
| 66.57 | 9.73 | 0.5037 | 0.15 | 9.85 |
| 101.04 | 9.82 | 0.5025 | 0.10 | 9.90 |
| 207.33 | 9.91 | 0.5012 | 0.05 | 9.95 |
| 999.00 | 10.00 | 0.5003 | 0.01 | 9.99 |

The KS/KBS composition preferably contains low levels of carbonate. Carbonates are undesirable to be included in fertilizers.

The process for producing the KS/KBS solution of the present invention is performed at such a pH so as to avoid absorption of CO$_2$ from refinery gas and from the SO$_2$ stream, to avoid the undesirable formation of potassium carbonate/bicarbonate in the KS/KBS solution. Formation of potassium carbonates is undesirable because it "ties up" the potassium, preventing it from forming potassium sulfite and potassium bisulfite. The higher the pH, the higher percentage of KS vs. percentage of KBS will be in the solution (see Table 1), however, the high pH has the detrimental effect of CO$_2$ co-absorption from the gas stream. This will reduce the sulfur content in the solution, replacing it with carbon. Carbonate is undesirable in those fertilizers that are blended in low pH with each other due to froth formation. Also reflected in Table 1 is the "S/C" ratio of the KS/KBS composition at varying pH levels. The S/C ratio reflects the ratio sulfite (S) to carbonate (C); the lower the S/C ratio, the higher will be the percentage of sulfur in the finished product.

In a preferred embodiment, the fertilizer composition will have a ratio of potassium to sulfur of 8:3.

In another preferred embodiment, the fertilizer composition will have a maximum amount of carbonate in the range of 0.5-1.0%.

The pH of the fertilizer composition may be adjusted (or the pH may vary based upon factors such as the process parameters by which it is produced). As the pH is adjusted, the ratio of KS to KBS changes accordingly. The composition of the invention may comprise from 0-100% of KS, KBS or a mixture of KS and KBS with the relative amounts of KS and KBS varying based on the pH of the composition.

The liquid fertilizer composition, for use in a method according to an embodiment of the invention, may comprise a mixture of potassium sulfite and potassium bisulfite, in a KS:KBS ratio in the range of about 7.3:2.7 to about 9.2:0.80 at a pH of about 7.5 to about 8.5.

A dry composition (without water) of the fertilizer composition may contain about 100% of KS/KBS.

In one embodiment, a solution in water of the fertilizer composition may contain about 35-45 wt. % KS/KBS.

In another embodiment, a solution in water of the fertilizer composition may contain about 35-41 wt. % KS/KBS.

In a preferred embodiment of the invention, the KS/KBS solution has a pH of about 8.5, and a total solution concentration of about 40 wt. % KS/KBS (mainly KS), about 17 wt. % SO$_2$, and up to about 0.5 wt. % sulfate as SO$_4$, with the remainder being water. Low levels of other impurities may be present (<0.5% carbonate). If refinery SO$_2$ gases are used, 0.1-1% of hydrocarbon impurities may accompany the product that could be removed by sparging with nitrogen or air. Higher levels of sulfate will be potassium sulfate (>0.5%), and will crystallize and precipitate out in solution that could be removed by filtration. Therefore, it is desirable to maintain levels of sulfate below about 0.5 wt. %. It is also preferable that production of the KS/KBS solution be carried out at a pH of about 8.5-9.0 or more preferably at a lower pH of 8.2-8.6, to minimize the absorption of CO$_2$ from the SO$_2$ refinery off-gas.

KS/KBS is easy to handle, blends well with other liquid fertilizers, contains a fairly high level of potassium and sulfur (0-0-23-8S) and has a lower salt index than potassium thiosulfate (KTS®) (salt index 46 vs. 64) with a pH between 7.5 and 8.5.

The amount of KS in the KS/KBS solution (% KBS) is in the range of about 1-45 wt. %. In a preferred embodiment of the invention, the amount of KS is about 43-44 wt. % of the total liquid solution. If the liquid fertilizer solution is converted to a dry form, then amount of active material would be up to 100%, using careful drying to avoid the formation of potassium sulfate.

The present invention also relates to a method for fertilizing agricultural crops by applying a fertilizer comprised primarily of KS/KBS. More specifically, described herein is a method for using the fertilizer described herein as a starter fertilizer.

KS/KBS may be applied by a variety of methods, along with other fertilizers or pesticides or by itself, such as: as a starter or other fertilizer, as an in-furrow treatment, as a foliar fertilizer, as a side-dressed treatment after planting, as a pre-plant soil injected fertilizer, and for broadcast, soil-injection and fertigation applications.

KS/KBS is useful in no-tillage and minimal tillage conditions where it can be injected into the soil, surface dribbled in a band, sprayed between crop rows, or broadcast applied to meet the crops potassium and sulfur requirements. KS/KBS can be applied with herbicides to reduce the amount of trips over the field thus saving time, fuel and reducing soil compaction.

The fertilizer is useful in dry (non-irrigated) soil and in irrigated soil.

The fertilizer is beneficial for fertilizing all crops. Non-limiting examples of crops which may be treated with the fertilizer of the invention include barley, corn, cotton, sorghum, soybean, sugar beets, wheat, tomatoes and potatoes.

For example, in an embodiment of the invention, the fertilizer is used to enhance the germination of grain crops such as corn.

The fertilizer is applied at different rates (i.e., amounts) depending upon the method of fertilization.

If the fertilizer is being applied directly next to the seed in a clay loam soil, then it should be applied at a rate of about 0.25-25 gal/acre. More preferably, it should be applied at a rate of about 1-12 gal/acre. Still more preferably, it should be applied at a rate of about 1-8 gal/acre.

If the fertilizer is being applied directly next to the seed in a sandy soil, then it should be applied at a rate of about 0.12-15 gal/acre. More preferably, it should be applied to sandy soil at a rate of about 0.5-7.5 gal/acre. Still more preferably, it should be applied to sandy soil at a rate of about 0.5-4 gal/acre.

If the fertilizer is being applied 2 inches to the side of the seed row and 2 inches below the seed row (i.e., 2×2 application) or 2 inches to the side of the seed on the surface, 2×0 or any other spacing close to the seed greater than 2 inches, then it should be applied at a rate of about 0.25-80 gal/acre. More preferably, in a 2×2, 2×0 or any other spacing close to the seed greater than 2 inches, application of fertilizer should be applied at a rate of about 1-40 gal/acre. Still more preferably, in a 2×2 application, 2×0 or any other spacing close to the seed greater than 2 inches, fertilizer should be applied at a rate of about 1-15 gal/acre.

If the fertilizer is being applied on the soil, regardless of what type of soil, away from the seed (greater than 2 inches), then it should be applied at a rate of about 1-80 gal/acre. More preferably, it should applied at a rate of about 1-60 gal/acre. Still more preferably, it should be applied at a rate of about 1-40 gal/acre.

If the fertilizer of the invention is being applied concurrently or immediately after or before another fertilizer, then the amount of the fertilizer of the invention should be adjusted. For example, if the KS/KBS fertilizer of the invention is applied with another fertilizer such as ammonium polyphosphate, APP (10-34-0 or 11-37-0), then the amount of KS/KBS fertilizer should be adjusted. Both KS/KBS and APP are salts, as are most fertilizers, and therefore there is a limit to how much of the fertilizer can be applied with the seed without harming the seed. The amount of KS/KBS should be reduced when applied with these or any fertilizer with the seed or near the seed because of accumulative effect from salt damage. For corn, growers apply from 1 to 5 gal/acre of APP 10-34-0 with the seed. If they apply KS/KBS in combination with the APP 10-34-0, then the rate of application of KS/KBS should not exceed 5 gallons/acre at the maximum rate of 10-34-0.

If soil conditions are dry, then growers should not apply KS/KBS with the seed, to avoid the possibility of desiccation of the seed. This is because KS/KBS, like most other fertilizers, is a salt, which would draw moisture away from and out of the seed, which is referred to as the salt effect of the fertilizer. A dry soil, in this case, would be one that does not have adequate moisture for good germination.

If soil conditions are dry, then growers should not apply KS with the seed, to avoid the possibility of desiccation of the seed. This is because KS, like most other fertilizers, is a salt, which would draw moisture away from and out of the seed, which is referred to as the salt effect of the fertilizer. A dry soil, in this case, would be one that does not have adequate moisture for good germination.

In a greenhouse study at South Dakota State University (SDSU), corn seeds were planted in a medium to fine textured soil with a CEC of 25 and adequate moisture. The objective of the study was to determine how much of an effect selected fertilizers have on seed germination. Several commonly used fertilizers were tested at different rates. Injury coefficients were developed from regression analysis for each fertilizer tested and are reported in the FIGURE. The higher the number, the greater the potential damage to germinating seeds. The approximate amount of fertilizer that can be placed with the seed was calculated by assuming a maximum amount of stand loss (percentage) allowed due to fertilizer placement.

Example 1

Based on a maximum 4% stand loss due to fertilizer placement, the amount of 9-18-9 that can be placed with the corn seed on 30" rows is: 4 (percent stand loss) divided by the slope coefficient from Table 1 for that fertilizer. In this case, the slope coefficient for 9-18-9 is 0.16.

4/0.16=25 lbs/acre of 9-18-9 applied in-furrow.

Example 2

Fertilizer blends can be calculated using this data. If the desired rate of 10-34-0 is 4.0 gal/acre plus 1.0 gal/acre of potassium thiosulfate, the quantity of this blend that can be safely applied with the seed, given a maximum stand loss of 4%.

From the FIGURE, the injury coefficient for 10-34-0 is 0.057 and for potassium thiosulfate is 0.18. Multiply the gallons of material for each product by the coefficient for that product then add the results together and divide by 5.

| | | | |
|---|---|---|---|
| 10-34-0: | 4 gal × 0.057 | = | 0.229 |
| potassium thiosulfate: | 1 gal × 0.18 | = | 0.180 |
| Total = | 0.409/5 | = | 0.082 (coefficient for blend) |

Maximum rate of application for this blend is: 4/0.082=49 lbs/acre or approximately 4 gal/acre.

Example 3

If the desired rate of 10-34-0 is 4 gal/acre plus 1.0 gal/acre of KS/KBS, the quantity of this blend that can be safely applied with the seed, given a maximum stand loss of 4%:

| | | | |
|---|---|---|---|
| 10-34-0: | 4 gal × 0.057 | = | 0.229 |
| KS/KBS: | 1 gal × 0.02 | = | 0.02 |
| Total = | 0.249/5 | = | 0.05 (coefficient for blend) |

Maximum rate of application of this blend: 4/0.05=80 lbs/acre or approximately 1.6 times more than the 10-34-0/potassium thiosulfate blend and 3.2 times more than the 9-18-9 blend.

When products were tested by themselves, KS/KBS was found to be on the order of 9 times (v/v) safer to germinating seed than potassium thiosulfate, 6 times safer than potassium sulfate and 22 times safer than potassium chloride. The SDSU study shows that no more than 28 pounds of potassium thiosulfate, 42 pounds of potassium sulfate and 11.4 pounds per acre of potassium chloride could be applied safely with the seed before germination was negatively affected, compared to 250 pounds per acre of KS/KBS. This is equivalent to approximately to 7 pounds per acre of $K_2O$ for potassium thiosulfate, 21 pounds per acre of $K_2O$ for potassium sulfate, 6.8 pounds per acre of $K_2O$ for potassium chloride and 57 pounds per acre of $K_2O$ for KS/KBS. Therefore, the amount of KS/KBS that can be safely applied with the seed is several times the amount of the other commonly used potassium based fertilizers and many more times what is needed for an in-furrow application.

A soybean germination trial was initiated near Jackson, Tenn. to test the results of the laboratory study. The study was conducted on a silt loam soil with a CEC of 7.5, pH of 6.6 and organic matter content of 1.4 percent. Soybeans were chosen because they are reported to be 6 times more sensitive to fertilizer salts than corn. Four rates of KS/KBS were applied to the seed as an in-furrow treatment: 0.0, 2.0, 5.0 and 10.0 gallons per acre. The study was replicated 3 times. Stand counts and phytotoxicity data were collected and reported in Table 2. There was no significant difference in plant populations between treated and untreated soybeans in this trial based on the number of soybean seedlings completely emerged. However, treatments 2 and 3 (2.0 and 5.0 gal/acre of KS/KBS) had the greatest number of emerged soybeans with 168 plants each per 30 feet of row, while the untreated check had the second lowest number of emerged soybeans with 155.7 plants per 30 feet of row. Treatment 4, the high rate of KS/KBS (10 gal/acre) had the lowest number of plants with 136.7 per 30 feet of row. This represents approximately 27 pounds of potassium applied directly in the seed furrow without any significant damage to germination. Soybeans are reported to be able to compensate as much as a 15% reduction in plant population without seriously affecting yield by increasing lateral branching and pods.

At the same location, a corn germination trial was established utilizing the same in-furrow KS/KBS treatments as the soybean study. Results are reported in Table 3. There was no significant difference between treatments using different rates of application of KS/KBS as to the number of corn seedlings per 30 feet of row. Readings were taken 10 days after treatments were applied. However, all of the KS/KBS treatments increased germination and stand count over the untreated check (48 plants), with the high rate of KS/KBS (10 gal/acre) having the greatest number of plants per 30 feet of row (65 plants), followed by the 5.0 gal/acre rate (60 plants) and then the 2 gal/acre rate (55 plants). No phytotoxicity was observed in any of the treatments. The high rate of KS/KBS increased the number of plants over the check by 35%.

A starter fertilizer trial on corn was established in southern Wisconsin near the town of Verona on a silt loam soil with a pH of 6.2, CEC of 11 and an organic matter of 2.3 percent. All the treatments were applied in-furrow at planting comparing KS/KBS against a standard application of potassium thiosulfate. All treatments, excluding the check plot, received 3 gal/acre of 10-34-0 along with the potassium treatments to make an N, P, K, and S blend. Results are reported in Table 4. All the potassium treatments increased the yield over the check and 10-34-0 treatment, but not enough to be significant at the 5% level. Treatment 7 (KS/KBS at 5.3 gal/acre) was the highest yielding at 180 bu/acre followed by treatments 5 and 6 (KS/KBS at 2.6 and 4.0 gal/acre) each at 177 bu/acre. The potassium thiosulfate treatment yielded 175.5 bu/ac, 8.5 bu/acre increases over the check plot and 16.4 bu/acre increases over the 10-34-0 treatment. There were no significant differences in plant populations across all treatments, even at the high rate of KS/KBS which had a combined rate of N+K in-furrow of 17.5 lbs/acre. This is well above the normal guidelines recommended by some universities of 8 to 10 lbs/acre of N+K that can be safely applied with the seed. Plant height and weight were positively affected by the potassium treatments with treatment 6 (KS/KBS at 4.0 gal/acre) having the tallest plants and the most weight, almost 7 inches taller than the check. However, there were no significant differences between the treatments for plant height or weight.

Foliar Application

Foliar fertilizers have been around for at least 50 years and are applied when soil conditions may be limiting crop growth due to temporarily unavailable and/or inadequate nutrient supply. KS/KBS was tested as a foliar application on corn and soybeans to determine phytotoxicity. Three treatments at 1.0, 2.0 and 3.0 gal/acre of KS/KBS along with 1.0 gal/acre of N-Sure® was applied to corn leaves and observed for phytotoxicity. N-Sure® is a liquid slow-release nitrogen fertilizer product that enhances foliar absorption of nutrients. Treatments were applied in the morning when the air temperature was approximately 80 degrees F., with 60 percent relative humidity. Afternoon temperatures on the same day of application reached 103° F., with a relative humidity of 40%. After 5 days, no phytotoxicity was observed in any of the treatments.

Sidedress Application

A greenhouse study was established to test the effect of high rates of KS/KBS on corn growth and development. The objective was to determine how much KS/KBS could be applied to corn before detrimental effects were observed. Three rates of KS/KBS: 20, 40 and 80 gal/acre were applied to young corn plants growing in ½ gallon containers. These treatments were compared to a check plot and 3 rates of potassium thiosulfate at the same volume of application: 20, 40 and 80 gal/acre. Each test treatment was replicated 6 times. The results are reported in Table 5. All of the treatments significantly increased the fresh weight of the corn over the check, except the high rate of potassium thiosulfate (80 gal/acre), which had the lowest fresh weight. The treatment with the greatest fresh weight was the 20 gal/acre of potassium thiosulfate followed by the 40 gal/acre of KS/KBS. There was no significant difference in plant height. The treatments with the tallest plants were the KS/KBS at 40 gal/acre with 34 inches of growth followed by the 20 and 40 gal/acre rates of potassium thiosulfate, both at 32.7 inches of growth. The untreated check had the least amount of growth at 22.3 inches.

CONCLUSION

Laboratory studies and field trials have proven potassium sulfite/potassium bisulfite (KS/KBS) to be an effective and safe source of potassium and sulfur for crop production. For in-furrow starter fertilizers, as well as 2×2 applications, the amount of potassium sulfite/potassium bisulfite that can be safely applied with the seed is approximately 4 to 6 times more than potassium sulfate, and approximately 10 to 22 times more than potassium chloride on medium to fine textured soils. The ratio of potassium to sulfur in potassium sulfate is approximately the same as the ratio of potassium to sulfur in KS/KBS. A liquid fertilizer comprising or composed primarily of KS/KBS is readily absorbed into the soil thereby reducing the amount of free salt available that could be harmful to germination.

Using corn as an indicator crop, KS/KBS appears to be safe on foliage, especially when combined with NSure®, which improves coverage and absorption into the leaf.

Greenhouse study and on-going field trials indicate that KS/KBS is a safe and effective source of potassium and sulfur for crop production. KS/KBS can be easily mixed with liquid phosphate fertilizers like 10-34-0 or nitrogen fertilizers like UAN solution and injected into the soil, reducing potential loss of nutrients to erosion. KS/KBS can be an important source of potassium and sulfur for the liquid fertilizer industry.

TABLE 2

The Effect of Potassium Sulfite/Potassium Bisulfite
(KS/KBS) as an In-Furrow
Treatment on Soybean Emergence and Phytotoxicity

| Treatment | Rate gal/acre | Soybean Emergence | % Phytotoxicity[a] |
|---|---|---|---|
| Untreated Check | — | 155.7 a | 0.0 |
| Potassium Sulfite/ Potassium Bisulfite | 2.0 | 168.3 a | 0.0 |
| Potassium Sulfite/ Potassium Bisulfite | 5.0 | 168.0 a | 0.0 |
| Potassium Sulfite/ Potassium Bisulfite | 10.0 | 136.7 a | 0.0 |

[a]= Percent phytotoxicity observed on seedlings 9 days after emergence.

TABLE 3

The Effect of Potassium Sulfite/Potassium Bisulfite (KS/KBS) on
Corn Emergence and Phytotoxicity

| Treatment | Rate gal/acre | Corn Emergence | % Phytotoxicity[a] |
|---|---|---|---|
| Untreated Check | — | 48.0 a | 0.0 |
| Potassium Sulfite/ Potassium Bisulfite | 2.0 | 55.0 a | 0.0 |
| Potassium Sulfite/ Potassium Bisulfite | 5.0 | 60.0 a | 0.0 |
| Potassium Sulfite/ Potassium Bisulfite | 10.0 | 65.7 a | 0.0 |

[a]= Percent phytotoxicity observed on seedlings 10 days after emergence.

TABLE 4

The Effect of Potassium Sulfite/Potassium Bisulfite Applied
as an In-furrow Application on Corn.

| Treatments | Rate/ac | Yield bu/ac | # Plants/ 60 ft row | Plant Ht inches | Plant Wt Lbs/12 plts |
|---|---|---|---|---|---|
| Untreated Check | — | 167.0 | 98 | 52.9 | 0.82 |
| 10-34-0 | 3.0 gal | 159.1 | 98 | 52.3 | 0.90 |
| 10-34-0 + potassium thiosulfate | 3.0 gal 1.0 gal | 175.5 | 100 | 57.1 | 1.17 |
| 10-34-0 + KS/KBS | 3.0 gal 1.3 gal | 173.4 | 101 | 55.6 | 1.07 |
| 10-34-0 + KS/KBS | 3.0 gal 2.6 gal | 177.6 | 97 | 56.7 | 1.11 |
| 10-34-0 + KS/KBS | 3.0 gal 4.0 gal | 177.2 | 98 | 59.8 | 1.20 |
| 10-34-0 + KS/KBS | 3.0 gal 5.3 gal | 180.0 | 98 | 58.1 | 1.15 |

TABLE 5

Greenhouse Study on the Effects of
KS on Corn Growth and Development.

| Treatment | Fresh Wt | Dry Wt | Height (inches) |
|---|---|---|---|
| 1.) Untreated Check | 60.4 a | 11.6 a | 22.3 |
| 2.) KTS® 20 gal | 88.8 c | 16.8 c | 32.7 |
| 3.) KTS® 40 gal | 78.6 bc | 15.2 bc | 32.7 |
| 4.) KTS® 80 gal | 73.7 abc | 14.4 abc | 30.3 |
| 5.) KS/KBS 20 gal | 79.3 bc | 15.8 bc | 28.3 |
| 6.) KS/KBS 40 gal | 83.3 bc | 16.2 bc | 34.0 |
| 7.) KS/KBS 80 gal | 79.7 bc | 13.5 ab | 30.0 |

(1) Gelderman, Dr. Ron, S. D. S. U., Fertilizer Placement with Seed—A Decision Aid, March 2007.
(2) Gordon, B. 1999. Effects of Placement, Rate, and Source of Starter Fertilizer Containing Potassium on Corn and Soybean Production. Kansas Fertilizer Research. Report 847. KSU, Manhattan, Kans.
(3) Harapiak, J. T., N. A. Flore. 1995. Fertilizer Nitrogen Management Options. Proc. WCFA Agronomy Workshop. Red Deer, AB, Canada.
(4) Conversations with Dr. Ron Gelderman, South Dakota State University Soil Testing Laboratory.

What is claimed:

1. A method for fertilizing agricultural crops comprising applying a liquid fertilizer composition comprising potassium sulfite and potassium bisulfite in a ratio of potassium sulfite to potassium bisulfite in the range of about 7.3:2.7 to about 9.2:0.80 at a pH of about 7.5 to about 8.5 simultaneously with, prior to or immediately after planting seed for the crop.

2. The method of claim 1, wherein the fertilizer composition comprises about 35-45 wt. % potassium sulfite and potassium bisulfite.

3. The method of claim 1, wherein the fertilizer composition comprises about 35-41 wt. % potassium sulfite and potassium bisulfite.

4. The method of claim 1, wherein the fertilizer composition comprises about 40 wt. % potassium sulfite and potassium bisulfite.

5. The method of claim 4, wherein the fertilizer composition comprises water.

6. The method of claim 2, wherein the fertilizer composition comprises water and about 17 wt. % $SO_2$.

7. The method of claim 1, wherein the fertilizer composition comprises water and up to about 0.5 wt. % $SO_4$.

8. The method of claim 1, wherein the fertilizer composition comprises less than about 1.0 wt. % carbonate.

9. The method of claim 1, wherein the fertilizer composition has a salt index of about 46.

10. The method of claim 1, wherein the fertilizer composition has a ratio of potassium to sulfur of 8:3.

11. The method of claim 1, wherein the fertilizer composition has a pH of about 8.5, and a total solution concentration of about 40 wt % KS/KBS, about 17 wt. % $SO_2$, and up to about 0.5 wt % sulfate, and a remainder being water.

12. The method of claim 1, wherein the fertilizer composition consists essentially of potassium sulfite, potassium bisulfite and water.

13. The method of claim 12, wherein the composition has a pH range of about 7.5-8.5.

14. The method of claim 1, wherein potassium sulfite and potassium bisulfite together form a total solution concentration of about 40 wt % of the composition, and the composition has a pH of about 8.5.

15. The method of claim 1 wherein the method for applying fertilizer composition is selected from the group consisting of in-furrow application, foliar application, side-dress treatment after planting, pre-planting soil injection, broadcast application and fertigation.

16. The method of claim 15 wherein the crop is selected from the group consisting of barley, corn, cotton, sorghum, soybeans, sugar beets, wheat, tomatoes and potatoes.

17. The method of claim 16 wherein the crop is corn.

18. The method of claim 16 wherein the fertilizer composition comprises about 35 to about 45 wt % potassium sulfite and potassium bisulfite and is applied next to seed in a clay loam soil at a rate of about 0.25-25 gallons/acre.

19. The method of claim 16 wherein the fertilizer composition is applied next to seed in a clay loam soil at a rate of about 1-12 gallons/acre.

20. The method of claim 16 wherein the fertilizer composition is applied next to seed in a clay loam soil at a rate of about 1-8 gallons/acre.

21. The method of claim 16 wherein the fertilizer composition is applied next to seed in a sandy soil at a rate of about 0.12-15 gallons/acre.

22. The method of claim 16 wherein the fertilizer composition is applied next to seed in a sandy soil at a rate of about 0.5-7.5 gallons/acre.

23. The method of claim 16 wherein the fertilizer composition is applied next to seed in a sandy soil at a rate of about 0.5-4 gallons/acre.

24. The method of claim 16 wherein the fertilizer composition is applied to a side of a seed row and below the seed row, at a rate of about 0.25-80 gallons/acre.

25. The method of claim 16 wherein the fertilizer composition is applied to a side of a seed row and below the seed row, at a rate of about 1-40 gallons/acre.

26. The method of claim 16 wherein the fertilizer composition is applied to a side of a seed row and below the seed row, at a rate of about 1-15 gallons/acre.

27. The method of claim 16 wherein the fertilizer composition is applied on soil away from the seed at a rate of about 1-80 gallons/acre.

28. The method of claim 16 wherein the fertilizer composition is applied on soil away from the seed at a rate of about 1-60 gallons/acre.

29. The method of claim 16 wherein the fertilizer composition is applied on soil away from the seed at a rate of about 1-40 gallons/acre.

30. The method of claim 1 wherein the method for applying is in-furrow application.

31. The method of claim 1 wherein the method for applying is foliar application.

32. The method of claim 1 wherein the method for applying is side dress application.

33. The method of claim 1 wherein the method for applying is side dress after planting.

34. The method of claim 1 wherein the method for applying is via soil injection.

35. The method of claim 1 wherein the method for applying comprises applying the composition next to the seed.

36. The method of claim 1 wherein the method comprises applying the composition to soil in which the crop is planted at a location about 2 inches to a side of and about 2 inches below a seed row.

37. The method of claim 1 wherein the method comprises applying the composition to soil in which the crop is a planted at a location about 2 inches to a side of and on the soil's surface.

38. The method of claim 1 wherein the crop is soybeans.

39. The method of claim 1 wherein the liquid fertilizer composition is mixed with liquid phosphate fertilizers, nitrogen fertilizers, or both.

40. A method for fertilizing an agricultural crop comprising applying a fertilizer composition comprising potassium sulfite and potassium bisulfite, said composition having a potassium sulfite to potassium bisulfite ratio of between about 7.3:2.7 to about 9.20:0.80, by applying the fertilizer to the crop by a method selected from the group consisting of in-furrow application, foliar application, side-dress treatment, pre-planting soil injection, broadcast application and fertigation.

41. The method of claim 40, wherein the fertilizer composition is dry and granular.

42. The method of claim 40, wherein the fertilizer composition is applied as a liquid and the liquid has a neutral to slightly alkaline pH.

43. The method of claim 40, wherein the fertilizer composition has a salt index of about 46.

44. The method of claim 40, comprising applying the composition to the soil at a location comprising:
(a) about 2 inches to a side of and about 2 inches below a seed row, or
(b) about 2 inches to the side of the seed row and on the soil's surface.

45. A method of enhancing germination of seeds and early growth of a small grain crop selected from the group consisting of barley, corn, cotton, sorghum, soybean, sugar beets and wheat, comprising applying a composition consisting essentially of potassium sulfite and potassium bisulfite on or near the seeds.

46. The method of claim 45 comprising applying the composition to soil near the seeds by a method selected from the group consisting of in-furrow application, side-dress treatment, soil injection, broadcast application and fertigation.

47. The method of claim 45 comprising applying the composition to the soil at a location comprising:
(a) about 2 inches to a side of and about 2 inches below a seed row, or
(b) about 2 inches to the side of the seed row and on the soil's surface.

48. The method of claim 45 wherein the composition has a fertilizer grade of 0-0-23-8S.

49. A fertilizer composition in dry granular form comprising about 100 wt. % of potassium sulfite and potassium bisulfite.

50. The fertilizer composition of claim 49 comprising about 35-45 wt. % potassium sulfite and potassium bisulfite.

51. The fertilizer composition of claim 49, comprising about 35-41 wt. % potassium sulfite and potassium bisulfite.

52. The fertilizer composition of claim 49, comprising about 40 wt. % potassium sulfite and potassium bisulfite.

53. The fertilizer composition of claim 52, further comprising about 17 wt. % $SO_2$.

54. The fertilizer composition of claim 53, further comprising up to about 0.5 wt. % $SO_4$.

55. The fertilizer composition of claim 54 further comprising a maximum amount of carbonate in the range of 0.5-1.0 wt. %.

56. The fertilizer composition of claim 49, having a salt index of about 46.

57. The fertilizer composition of claim 49, having a ratio of potassium to sulfur of 8:3.

* * * * *